United States Patent

McAuliffe

[15] 3,701,948

[45] Oct. 31, 1972

[54] SYSTEM FOR PHASE LOCKING ON A VIRTUAL CARRIER

[72] Inventor: Gerald K. McAuliffe, Mahopac, N.Y.

[73] Assignee: North American Rockwell Corporation

[22] Filed: Sept. 17, 1970

[21] Appl. No.: 72,962

[52] U.S. Cl. ......................325/329, 325/49, 325/60, 325/42, 325/138

[51] Int. Cl. ..............................................H04b 1/68

[58] Field of Search ........179/15 BC; 325/49, 50, 60, 325/137, 138, 329, 330, 346, 351, 444, 419, 41; 328/166; 329/122, 124; 332/22, 41, 44

[56] References Cited

UNITED STATES PATENTS 3,134,855 5/1964 Chasek..................179/15 BC

*Primary Examiner*—Albert J. Mayer

*Attorney*—L. Lee Humphries, H. Fredrick Hamann and Edward Dugas

[57] ABSTRACT

The present invention is directed to a phase lock system which can derive a demodulating carrier reference signal for use in a suppressed carrier quadrature, amplitude modulating digital data transmission system which does not require the transmission of a low level carrier or pilot tones. The system operates by multiplying the equalized received signal in each channel by the decoded *n*-level data signal of the other received channel, subtracting the products and dividing the result by the sum of the squares of the data signal levels to arrive at an error signal which is proportional to the phase error between the demodulating carrier reference signal and the suppressed transmitting carrier. The derived error signal can be made independent of data signal level values and the received signal levels even in the presence of severe intersymbol interference. The derived phase error signal is fed back to a variable oscillator providing the demodulating carrier reference signal to change the phase of the reference signal so as to reduce the error signal towards zero.

3 Claims, 7 Drawing Figures

RECEIVER

INVENTOR
GERALD K. McAULIFFE

BY Edward Dugas
ATTORNEY

INVENTOR.
GERALD K. McAULIFFE
BY Edward Dugas
ATTORNEY

RECEIVER

INVENTOR.
GERALD K. McAULIFFE
BY Edward Dugas
ATTORNEY

INVENTORS
GERALD K. McAULIFFE
BY
Edward Dugas
ATTORNEY

INVENTOR.
GERALD K. McAULIFFE
BY Edward Dugas
ATTORNEY

SYSTEM FOR PHASE LOCKING ON A VIRTUAL CARRIER

BACKGROUND OF THE INVENTION

The present invention relates generally to phase lock systems and, more particularly, to a system for deriving a phase error signal from an amplitude modulated, suppressed carrier signal without requiring the transmission of a low level carrier signal or pilot tones.

Phase lock systems or phase lock loops have been used in the past in many applications to recover or track the phase of the transmitting carrier of a received signal. Heretofore, such systems have required the transmission of some signal, in addition to the information signals, to indicate the phase of the transmitting carrier. For example, many amplitude modulation, suppressed carrier systems employ a phase locked loop in which the received signal includes a relatively low level carrier signal, or pilot tones, in addition to the information carrying sidebands. The sidebands are applied to a demodulation multiplier or phase detector (demodulator) which receives, as a second input, the output of a variable voltage controlled oscillator. The low level carrier signal, or pilot tones, are detected and compared with the oscillator output to develop an error signal proportional to the phase difference between the carrier and the oscillator output. This phase error signal is then generally low pass filtered which tends to eliminate all components other than the DC component indicative of the phase error. The filtered phase error signal is then DC amplified and applied to the oscillator to control its frequency so as to minimize the phase error. The low level carrier or pilot tones naturally decrease the signal energy available for the information signals and there has long been a need for a system for deriving a phase error signal for a phase lock system which did not consume transmitted energy.

A number of systems exist in the prior art for transmitting digital data over telephone lines and for correcting the distortion in the received signal due to varying transmission line distortion. One such system is disclosed in U.S. Pat. application, Ser. No. 817,887 now U.S. Pat. No. 3,614,623, entitled "Adaptive System for Correction of Distortion of Signals in Transmission of Digital Data," filed Apr. 21, 1969 by Gerald K. McAuliffe, the inventor of the present invention. The data transmission system disclosed therein transmits a four vector signal generated by combining two amplitude modulated data signal waves in quadrature. The two modulators used are of the switching type, each providing a double-sideband spectrum. The carrier for the two data signal trains are displaced by 90° and are added before transmission to provide a four phase data signal for transmission. To insure maximum utilization of the transmission channel, two orthogonal subchannels with multilevel amplitude modulation are used on each channel. With this arrangement, more than one bit of information may be transmitted in each Nyquist interval. (A Nyquist interval is that time period in which successive impulses may be transmitted by a channel without interference between the peaks of the received pulses; the corresponding Nyquist rate is a rate in signal values-per-second, numerically equal to approximately twice the available channel bandwidth in cycles per second). The receiver for the transmitted data signals includes individual detectors or demodulators for the quadrature carrier signal. The phases of the received in-phase and quadrature data signals are compared with the phase of a local oscillator including a 90° phase shifted output of the oscillator. The oscillator phase must track the phase of the transmitting carrier in order to eliminate the errors in the demodulated signals. One prior method of deriving the carrier frequency of the receiver for demodulation of the data signals is to transmit two pilot tones; e.g., 600 Hz and 3,000 Hz which are separated by 1,200 Hz or by the reciprocal at the symbol rate from the carrier of 1,800 Hz. Phase lock circuits of the receiver recover the two pilot tones from the received signals to enable reconstruction or derivation of the carrier frequency and data bit timing signals.

SUMMARY OF THE INVENTION

The phase lock system of the present invention provides a substantial improvement in deriving a virtual carrier for demodulating received amplitude modulated, suppressed carrier signals by controlling the frequency and phase of a local oscillator with an error signal derived from received data signals without the use of a low level carrier signal or pilot tones. The energy normally consumed by these additional signals may then be advantageously utilized in increasing the level of the transmitted information signals.

The error signal is generally derived in the system of the invention by multiplying the equalized received signals for each channel by the data signal level of the other channel, substracting the product and then dividing the result by the sum of the squares of the data signal levels. The error signals is then independent of the data signal level values and of the received signals in the channels.

In a presently preferred embodiment of the invention incorporated in an amplitude modulation, double-sideband, suppressed carrier, quadrature transmission system, the in-phase and quadrature channels of the receiver are identical and are each comprised of a demodulator means for receiving the transmitted digital data signal and for providing a demodulated data signal in accordance with a reference carrier signal. The output from the demodulator is fed to a low pass filter to eliminate high frequency components from the demodulated signal. A sample and hold circuit operating at the transmitted symbol rate samples the demodulated signal from the low pass filter and holds the sampled signal until the next sample time. The same and hold circuit passes its signal output to a summing amplifier where the equalization process takes place. The scanning amplifier then forwards the corrected or equalized signal to an analog to digital converter for transformation into an output data signal.

Accordingly, it is a primary object of the present invention to provide a new and novel phase lock system which does not require a low level carrier signal or pilot tones.

It is another object of the present invention to provide a system for detecting the phase error in a demodulated signal.

These and other objects of the present invention will become more apparent and better understood when taken in conjunction with the following description and the accompanying drawings, throughout which like characters indicate like parts and which drawings form a part of this application.

DESCRIPTION OF THE PREFERRED EMBODIMENT

Figure 1:
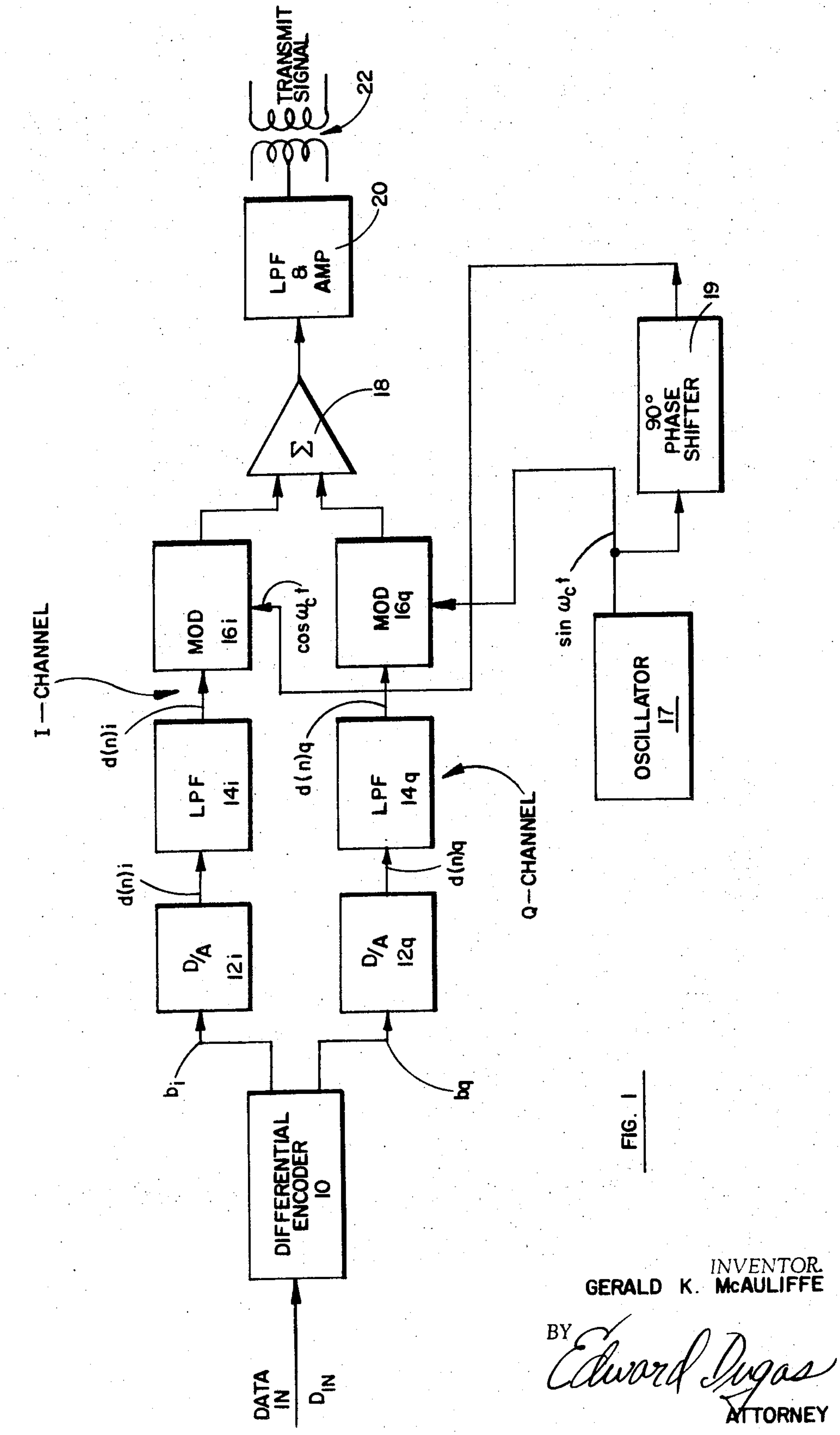
FIG. 1 is a block schematic diagram of a transmitter which may be used with the phase lock system of the present invention.

FIG. 1 discloses a transmitter which is particularly adapted to prepare and transmit the digital data signals which are to be received and demodulated using applicant's phase lock systems. A data bit stream $D_{in}$ in absolute form is applied to a digital differential encoder 10. The function of the differential encoder is to convert the input data bit stream $D_{in}$ from its "absolute" form to a "differential" form. A digital differential encoder is required in the transmitter portion of this system as well as a digital differential decoder in the receiver portion when used with applicant's invention. The preferred embodiment of the applicant's phase lock loop recovery system has a $\pi/2$ phase ambiquity.

Figure 2:
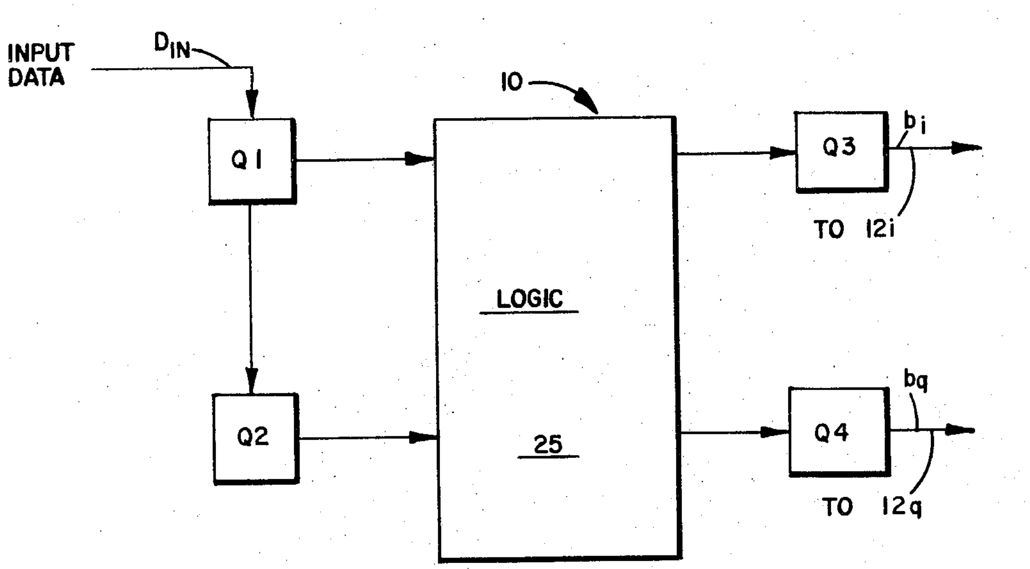
FIG. 2 is a block diagram of a differential encoder which may be used in the transmitter of FIG. 1.

Referring to FIG. 2 in connection with FIG. 1, the differential encoder 10, which is a two-level encoder, is shown comprised of flip-flops Q1, Q2, Q3 and Q4 and a logic block 25. The transmitted phase is determined by flip-flops Q3 and Q4 as shown in Table A–1. The input data $D_{in}$ is shifted into Q1 and Q2 and after each two bits of data are read in, Q3 and Q4 are set as shown in Table A–2 where $t_i$ is the $i$-th symbol time and $t_{i+1}$ is the $i+i$-th symbol time.

TABLE A-1

PHASE ENCODING

| Q3 | Q4 | Output Phase (Degrees) |
|---|---|---|
| 0 | 0 | 0 |
| 0 | 1 | 90 |
| 1 | 0 | 270 |
| 1 | 1 | 180 |

TABLE A-2

ENCODING LOGIC

| $Q_1$ | $t_i$ $Q_2$ | $Q_3$ | $Q_4$ | $t_{i+1}$ $Q_3$ | $Q_4$ |
|---|---|---|---|---|---|
| 0 | 0 | 0 | 0 | 0 | 0 |
| 0 | 0 | 0 | 1 | 0 | 1 |
| 0 | 0 | 1 | 0 | 1 | 0 |
| 0 | 0 | 1 | 1 | 1 | 1 |
| 0 | 1 | 0 | 0 | 0 | 1 |
| 0 | 1 | 0 | 1 | 1 | 1 |
| 0 | 1 | 1 | 0 | 0 | 0 |
| 0 | 1 | 1 | 1 | 1 | 0 |
| 1 | 0 | 0 | 0 | 1 | 0 |
| 1 | 0 | 0 | 1 | 0 | 0 |
| 1 | 0 | 1 | 0 | 1 | 1 |
| 1 | 0 | 1 | 1 | 0 | 1 |
| 1 | 1 | 0 | 0 | 1 | 1 |
| 1 | 1 | 0 | 1 | 1 | 0 |
| 1 | 1 | 1 | 0 | 0 | 1 |
| 1 | 1 | 1 | 1 | 0 | 0 |

Figure 3:
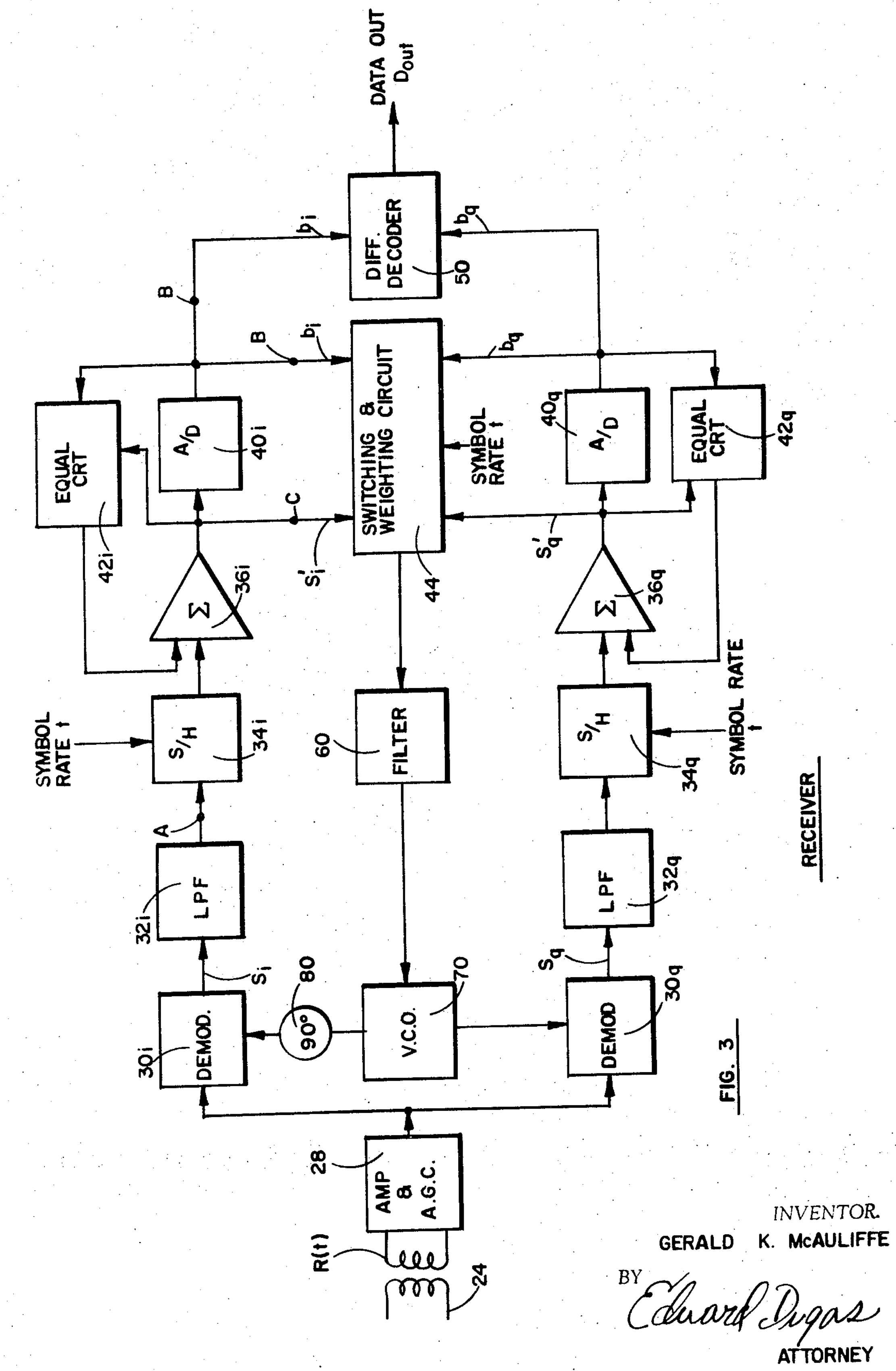
FIG. 3 is a block schematic diagram of a receiver utilizing the phase lock system of the present invention.

This particular coding allows the decoder, located in the receiver shown in FIG. 3 to decode the data in the receiver without knowing the absolute phase of the received signal which is necessary with this method of carrier recovery. The outputs from the differential encoder are split into two channels, one designated the I channel output and the other designated the Q channel. The digits from the I channel are labeled $b_i$ with the digits from the Q channel being labeled $b_q$. These digits are applied to a digital-to-analog converter 12, one for each of the channels, the output of which are designated $d(n)_i$ and $d(n)_q$, and which signals are fed to a low pass filter 14 for removal of the high frequency components caused by noise and harmonics that may be present in the respective channels. Oscillator 17 provides a basic carrier wave the frequency of which is determined by the characteristics of the transmission line. The carrier frequency $\text{Sin}\omega_c t$ is sent to modulator $16_q$ and to a 90° phase shifter 19. The output of the phase shifter 19 is the signal $\text{Cos}\omega_c t$ which is fed to modulator **16*i*. The filter signals $d(n)_i$ and $d(n)_q$ are modulated by modulator $16_i$ and $16_q$ at the carrier frequency and are summed together in a summing amplifier 18. The output of amplifier 18 is fed to a low pass filter and amplifier 20 to again remove high frequency components and any extraneous noise which may have entered the system and from there to a transmission line 22**, such as a telephone line.

Refer now to FIG. 3 wherein is disclosed the receiver for receiving the signals transmitted by the transmitter of FIG. 1. The receiving end of the transmission line 24 provides an input signal $R(t)$, to the amplifier and AGC circuit 28. The input signal $R(t)$ is expressed in the following form:

$$R(t)=X_i\,\text{Cos}\omega_c t+X_q\,\text{Sin}\omega_c t \qquad (1)$$

where $X_i$ is the general in-phase channel impulse response, $X_q$ is the general quadrature channel impulse response, and $\text{Cos}\omega_c$ and $\text{Sin}\omega_c t$ are the in-phase and quadrature carriers, $X_i$ and $X_q$ can be more explicitely defined in terms of sample data theory wherein each sample occurs at a symbol time $t_i$ as:

$$X_i=d(n)_i h_{0i}+d(n)_{i-1}h_{1i}+\ldots \qquad (2)$$

$$X_q=d(n)_q h_{0q}+d(n)_{q-1}h_{1q}+\ldots \qquad (3)$$

where $d(n)_i$ and $d(n)_q$ represent the signal level for the presently received data bits for an $n$-level modulation system;

$d(n)_{i-1}$, etc. and $d(n)_{q-1}$, etc. represent the signal level for the previously received data bits of the n-level modulation system; and $h_{0i}$, $h_{1i}$ etc. and $h_{0q}$, $h_{1q}$ etc. are the sample values of the in-phase and quadrature channel pulse response respectively.

The input signal $R(t)$ from the amplifier and AGC circuit is fed to demodulators 30$_i$ and 30$_q$. Demodulators 30$_i$ and 30$_q$ may, for example, be of the phase sensitive type so as to produce outputs $S_i$ and $S_q$ which are proportional to that component of the input signal which is in-phase with the reference signal applied to each demodulator from the voltage control oscillator 70. Between the quadrature channel demodulator 30 and the oscillator 70 there is interposed a 90° phase shifter 80 which shifts the phase of the reference signal sent to the quadrature channel demodulator 90° with respect to the reference signal sent to the in-phase channel demodulator. The output signals from demodulator 30$_i$ and 30$_q$ will then be $$S_i = R(t)\,\mathrm{Cos}(\omega_c t + \phi); \qquad (4)$$

$$S_q = R(t)\,\mathrm{Sin}(\omega_c t + \phi); \qquad (5)$$

respectively where $\phi$ is the phase error caused by demodulation with a reference carrier having a different phase from the phase of the modulated carrier of the transmitted signal.

Figure 4:
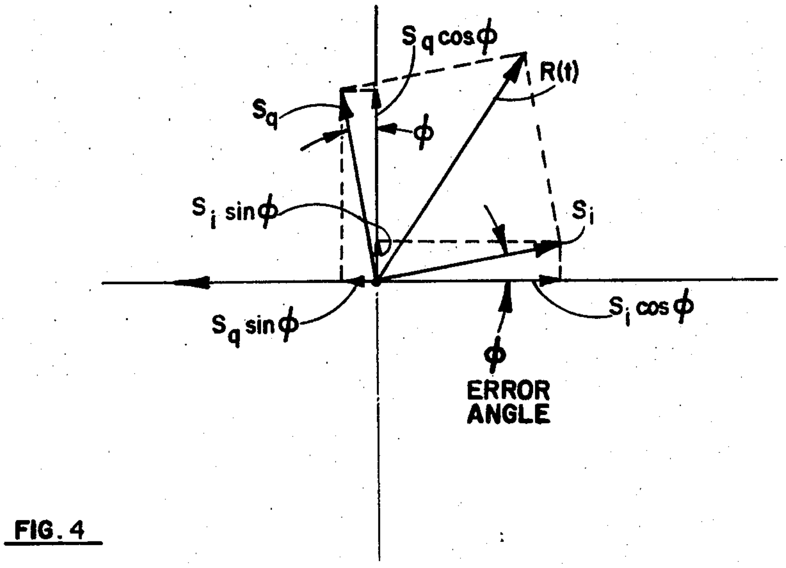
FIG. 4 is a vector diagram illustrating the relationship of the modulated received signal to the phase error of the quadrature demodulated signals.

FIG. 4 illustrates the vector relationships between the input signal $R(t)$, the major cosine, sine and components of $R(t)$, namely, $S_i$ and $S_q$, and the effect the phase error $\phi$ has upon these signals.

The $S_i$ and $S_q$ signals are then fed to the low pass filters 32$_i$ and 32$_q$ to remove all frequency components greater than $2\omega_c$. From the low pass filter, the signals from 32$_i$ and 32$_q$ are fed to a sample and hold means 34$_i$ and 34$_q$, respectively. The sample and hold means maintain the signals $S_i$ and $S_q$ available at their respective outputs.

The outputs from the sample and hold means 34$_i$ and 34$_q$ are fed to summing amplifiers 36$_i$ and 36$_q$, respectively. The outputs from amplifiers 36$_i$ and 36$_q$, designated $S_i'$ and $S_q'$, are fed to the analog-to-digital converters 40$_i$ and 40$_q$, respectively, and to the switching and weighting means 44. The analog-to-digital converters change the $S_i'$ and $S_q'$ signals deferred by equations (11) and (12), which are analog in form, into the corresponding bit signals $b_i$ and $b_q$, which are digital in form. The signals $b_i$ and $b_q$ correspond to the differentially encoded data bits in the I and Q channels. Switching and weighting means 44 receive as inputs the $S_i'$, $S_q'$, $b_i$, $b_q$ and symbol rate $t$ timing signals. Equalizer circuits 42$_i$ and 42 $_q$ receive the $S_i'$, $S_q'$, $b_i$ and $b_q$ signals from their respective circuits and produce the required equalization signals. The output of the equalizers is fed back to their respective summation amplifiers 36$_i$ and 36$_q$ to be subtracted from the signals from the sample and hold circuits 34. Mathematically, the output signals $S_i$ and $S_q$ from the demodulators 30$_i$ and 30$_q$ can be written as follows by substituting equation (1) into equations (4) and (5), performing the multiplications; and disregarding the $2\omega_c$ terms:

$$S_i = X_i \mathrm{Cos}\phi - X_q \mathrm{Sin}\phi \qquad (6)$$

$$S_q = X_q \mathrm{Cos}\phi + X_i \mathrm{Sin}\phi \qquad (7)$$

Substituting equations (2) and (3) into equations (6) and (7) gives the following results:

$$S_i = (d(n)_i h_{0i} + d(n)_{i-1} h_{1i} + \ldots)\,\mathrm{Cos}\,\phi - (d(n)_q h_{0q} + d(n)_{q-1} h_{1q} + \ldots)\,\mathrm{Sin}\,\phi \qquad (8)$$

$$S_q = (d(n)_q h_{0q} + d(n)_{q-1} h_{1q} + \ldots)\,\mathrm{Cos}\,\phi + (d(n)_i h_{0i} + d(n)_{i-1} h_{1i} + \ldots)\,\mathrm{Sin}\,\phi \qquad (9)$$

Equations (8) and (9) can, for this application, be considered simplified by assuming that the equalizer technique described in U.S. Pat. application Ser. No. 817,887, entitled "Adaptive System for Correction of Distortion of Signals in Transmission of Digital Data," filed Apr. 21, 1969, by applicant, Gerald K. McAuliffe, which invention is assigned to North American Rockwell the assignee of the present invention, will eventually force all $h_{ji}$ and $h_{jq}$ terms for $j = 1, 2, 3, 4,$ etc. to zero. The equalizer system disclosed in U.S. Ser. No. 817,887 now U.S. Pat. No. 3,614,623 can be inserted into the present system by connecting point A of the present system to the junction of block 54 and 57 shown in FIG. 1 of the reference application and the junction between block 57 and 73 of the reference to point C of the present application and the input to block 51 to the point A of the present application along with the deletion of blocks 34, 36, 40 and 42 of the present application shown in FIG. 3. It can also be shown that in fact $$h_{ji} = h_{jq} \qquad (10)$$

With these assumptions which are indicated by primes, equations (8) and (9) become $$S_i' = d(n)_i (h_0 \cos\phi) + d(n)_q (-h_0 \sin\phi) \qquad (11)$$

$$S_q' = d(n)_q (h_0 \cos\phi) + d(n)_i (+h_0 \sin\phi) \qquad (12)$$

When equation (111) is multiplied by $d(n)_q$ and equation (12) is multiplied by $d(n)_i$, we obtain:

$$d(n)_q S_i' = d(n)_i d(n)_q (h_0 \cos\phi) + d(n)_q^2 (-h_0 \sin\phi) \qquad (13)$$

$$d(n)_i S_q' = d(n)_i d(n)_q (h_0 \cos\phi) + d(n)_i^2 (+h_0 \sin\phi) \qquad (14)$$

Subtracting equation (14) from equation (13):

$$d(n)_q S_i' - d(n)_i S_q' = (d(n)_i^2 + d(n)_q^2)(-h_0 \sin\phi) \qquad (15)$$

and further dividing by $(d(n)_i^2 + d(n)_q^2)$, we obtain $$\frac{d(n)_q S'_i - d(n)_i S'_q}{d(n)_i^2 + d(n)_q^2} = -h_0 \sin\phi \qquad (16)$$

Equation (16) describes the output error signal from the switching and weighting means 44 which is fed to a filter 60 and from there to the voltage controlled oscillator 70 to drive the oscillator in a direction which causes the total error term (the term on the right side of equation (16)) to go towards zero. It should be noted that when the term represented in Equation (16) is caused to go to zero, the equations which represent the data signals in both the I and Q channels, equations

(11) and (12), respectively, became exactly independent. The voltage controlled oscillator 70 provides the demodulator carrier signal for demodulators 30$_i$ and 30$_q$. A 90° phase shifter 80 is interposed in the carrier signal path to demodulator 30$_i$.

Two examples of the implementation of the system of the present invention will now be given, one example for two-level modulation in each channel and another example for four-level modulation in each channel. In the two-level case, $d(n)_i$ and $d(n)_q$, each have level values of either ± 1. Simplifying $d(n)_i$ and $d(n)_q$ to $d_i$ and $d_q$, it can be seen that equation (15) reduces to:

$$d_q S_i' - d_i S_q' = -2(+h_0 \mathrm{Sin}\phi) \qquad (17)$$

Figure 5:
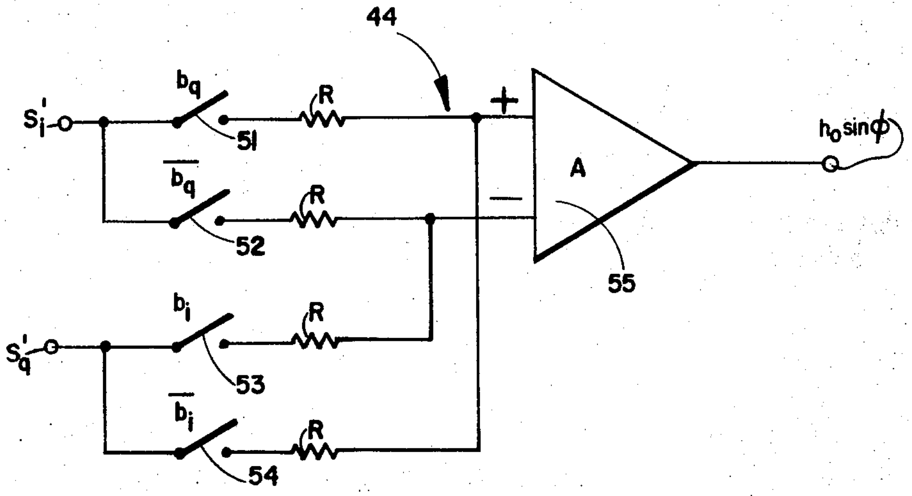
FIG. 5 is a schematic diagram of one embodiment of an error signal circuit used in the receiver embodiment shown in FIG. 3.

For the two-level case which has been discussed to this point, the switching and weighting means 44 can be mechanized by the circuit of FIG. 5. The signal $S_i'$ is connectable to the + and − terminals of amplifier 55 by means of switches 51 and 52, respectively. Resistors R are inserted in the serial path to adjust the amplification factor of amplifier 55. The signal $S_q'$ is connectable to the + and − terminals of amplifier 55 by means of switches 54 and 53, respectively. The switches 51 to 54 are field effect transistors controlled by digital signals $b$ applied to the respective gate electrodes. The $b$ symbol is used in the logic sense that when $b$ is true the transistor is conducting, and when b is false the transistor is non-conducting. Also, $b$ is true when data bit $d = +1$ and $b$ is false when $d = -1$. Switches 51 and 52 are controlled by the bit signals $b_q$ and $\bar{b}_q$ represent the complement of the respective digital bits. The timing signals are properly developed so that the switches are allowed to close only after the sample and hold circuits 34$_i$ and 34$_q$ have been switched to the "HOLD" condition; and so that the switches are again caused to open prior to the time the sample and hold circuits are switched to the "SAMPLE" condition so as to sample the next symbol.

If only one channel (for example, the I channel) is used to transmit data, the implementation is the same except that the Q channel analog to digital converter 40$_q$ and $d_q$ is set to zero. Equation (15) then reduces to $-d_i S_q' = -h_0 \mathrm{Sin}\,\phi$. The error signal is thereby reduced to one-half the magnitude of the previous case but this change is easily compensated for by increasing the gain in amplifier 55 or by increasing the sensitivity of the voltage controlled oscillator 70.

Figure 7:
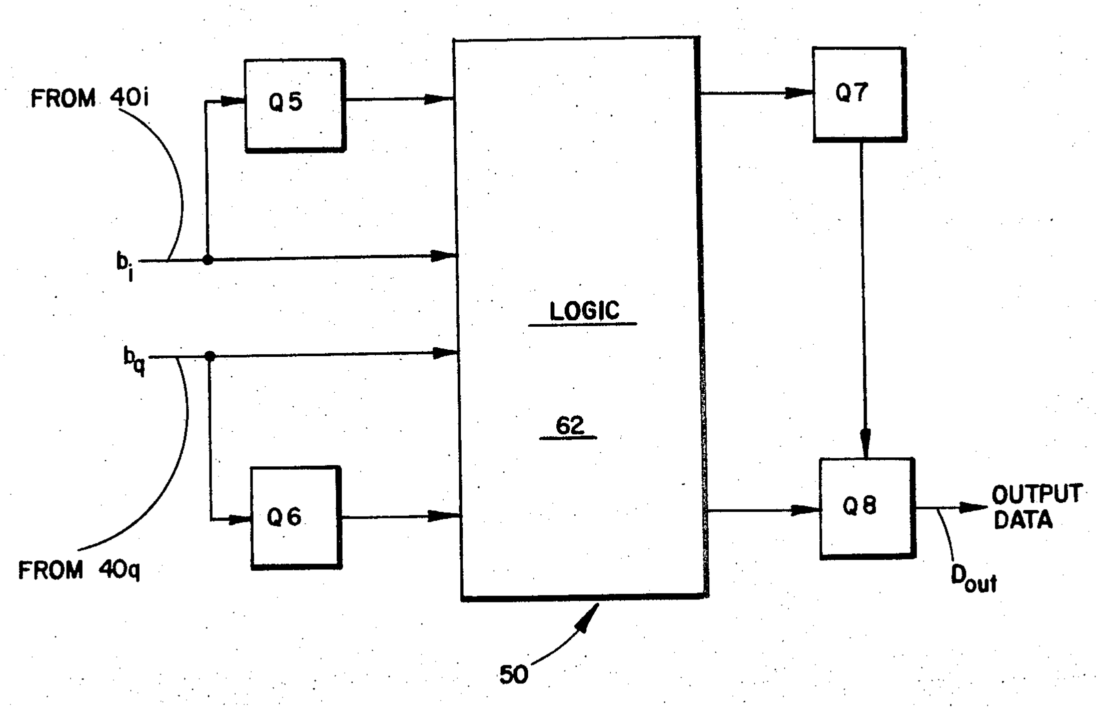
FIG. 7 is a block diagram of a differential decoder which may be used in the receiver embodiment of FIG. 3.

The output from each analog to digital converter 40 is fed to a differential decoder 50 which provides the digital output signal $D_{out}$. The differential decoder 50 is shown in detail in FIG. 7. The input signals $b_i$ and $b_q$ are fed to flip-flops $Q_5$ and $Q_6$, respectively, and to the logic block 52. The outputs from the logic block 52 are fed to flip-flops $Q_7$ and $Q_8$ with the output of $Q_7$ being fed to $Q_8$. The output of $O_8$ is the digital signal $D_{out}$. Tables A-3 and A-4 set forth the coding logic for logic block 52 and the operating states of flip-flops $Q_6$ through $Q_8$.

TABLE A-3

| $Q_5$ | $Q_6$ | Received Phase (Degrees) |
|---|---|---|
| 0 | 0 | 0 |
| 0 | 1 | 90 |
| 1 | 0 | 270 |
| 1 | 1 | 180 |

TABLE A-4

DECODING LOGIC

| $b_i$ | $d_q$ | $Q_5$ | $Q_6$ | $Q_7$ | $D_{out\,(Q8)}$ |
|---|---|---|---|---|---|
| 0 | 0 | 0 | 0 | 0 | 0 |
| 0 | 0 | 0 | 1 | 1 | 0 |
| 0 | 0 | 1 | 0 | 0 | 1 |
| 0 | 0 | 1 | 1 | 1 | 1 |
| 0 | 1 | 0 | 0 | 0 | 1 |
| 0 | 1 | 0 | 1 | 0 | 0 |
| 0 | 1 | 1 | 0 | 1 | 1 |
| 0 | 1 | 1 | 1 | 1 | 0 |
| 1 | 0 | 0 | 0 | 1 | 0 |
| 1 | 0 | 0 | 1 | 1 | 1 |
| 1 | 0 | 1 | 0 | 0 | 0 |
| 1 | 0 | 1 | 1 | 0 | 1 |
| 1 | 1 | 0 | 0 | 1 | 1 |
| 1 | 1 | 0 | 1 | 0 | 1 |
| 1 | 1 | 1 | 0 | 1 | 0 |
| 1 | 1 | 1 | 1 | 0 | 0 |

With four-level modulation, two data bits are derived from each sample, $S_i$ and $S_q$. Signal levels $d(n)_i$ and $d(n)$ each have four possible level values given by $d_{1i} + ½\, d_{2i}$ and $d_{1q} + ½\, d_{2q}$ where $d_1$ and $d_2$ are the two data bits derived from the sample $S_i$ or $S_q$ and each of which have level values of ±1. By substituting for $d(n)_i$ and $d(n)_q$, equation (16) reduces to $$\frac{(d_{1i}+\frac{1}{2}d_{2i})S'_i-(d_{1q}+\frac{1}{2}d_{2q})S'_q}{(d_{1i}+\frac{1}{2}d_{2i})^2+(d_{1q}+\frac{1}{2}d_{2q})^2}=-(h_o \mathrm{~Sin~} \phi) \qquad (18)$$

In this equation each $d_1 + ½\, d_2$ can take the following $d(n)$ signal level:

| $d_1$ | $d_2$ | $d(n) = d_1 + ½\, d_2$ |
|---|---|---|
| −1 | −1 | − 3/2 |
| −1 | +1 | − ½ |
| +1 | −1 | + ½ |
| +1 | +1 | + 3/2 |

Note that the sign of $d(n)$ is the same as the sign of $d_1$. If equation (16) is rewritten as $$\frac{d(n)_i}{d(n)_i^2+d^2(n)_q} S'_i - \frac{d(n)_q}{d^2(n)_i+d^2(n)_q} S'_q = -h_o \mathrm{~Sin~} \phi \qquad (19)$$

then a table for the coefficients of $S_i$ and $S_q$ is

| $d(n)_i$ | $d(n)_q$ | Coefficients of $S'_i$ | $S'_q$ |
|---|---|---|---|
| − 3/2 | − 3/2 | − ⅓ | − Δ |
| − 3/2 | − ½ | − 3/5 | − 1/5 |
| − 3/2 | + ½ | − 3/5 | + 1/5 |
| − 3/2 | + 3/2 | − ⅓ | + ⅓ |
| − ½ | − 3/2 | − 1/5 | − 3/5 |
| − ½ | − ½ | − 1 | − 1 |
| − ½ | + ½ | − 1 | + 1 |
| − ½ | + 3/2 | − 1/5 | + 3/5 |
| + ½ | − 3/2 | + 1/5 | − 3/5 |
| + ½ | − ½ | + 1 | − 1 |
| + ½ | + ½ | + 1 | + 1 |
| + ½ | + 3/2 | + 1/5 | + 3/5 |
| + 3/2 | − 3/2 | + ⅓ | − ⅓ |
| + 3/2 | − ½ | + 3/5 | − 1/5 |
| + 3/2 | + ½ | + 3/5 | + 1/5 |
| + 3/2 | + 3/2 | + ⅓ | + ⅓ |

The table can be simplified by noting that the sign of the coefficients for $S_i'$ is the sign of $d(n)_i$, and the sign of $S_q'$ is the sign of $d(n)_q$. Also that the magnitude of the coefficients is given by:

| $d(n)_i$ | $d(n)_q$ | Magnitude of Coefficients $S'_i$ | $S'_q$ |
|---|---|---|---|
| ± 3/2 | ± 3/2 | 1/3 | 1/3 |
| ± 3/2 | ± 1/2 | 3/5 | 1/5 |
| ± 1/2 | ± 3/2 | 1 | 1 |

Figure 6:
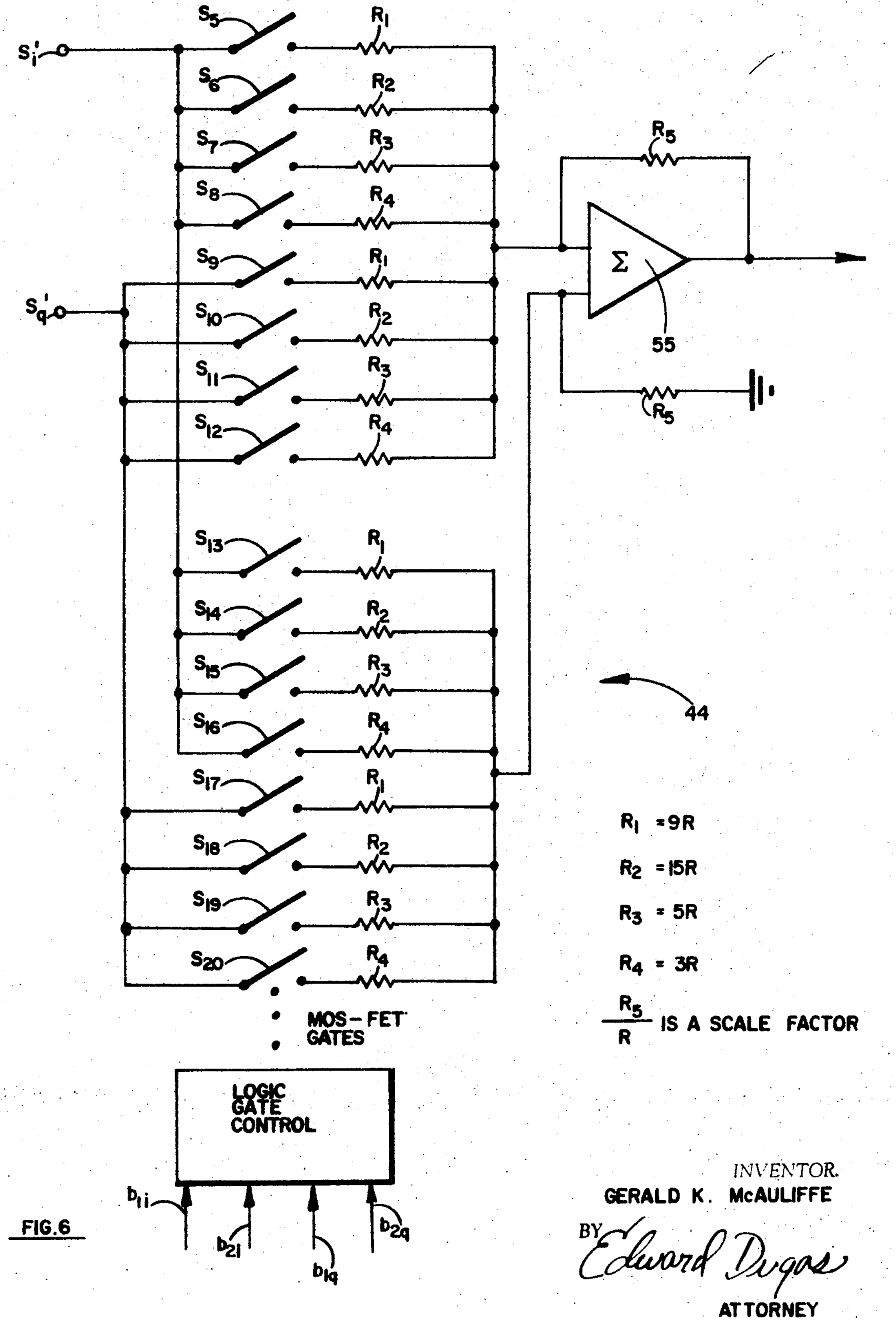
FIG. 6 is a schematic diagram of a second embodiment of an error signal circuit used in the receiver embodiment shown in FIG. 3.

The switching and weighting means 44 can be mechanized by the circuit of FIG. 6. Switches $S_5$ to $S_{20}$ are field effect transistors controlled by the digital signals $b_{1i}$, $b_{2i}$, $b_{1q}$ and $b_{2q}$. $b_{1i}$ is a logic signal which is true when the data bit $d_{1i}$ is +1 and $b_{1i}$ is false when the data bit $d_{1i}$ is −1. Similar correlation exists between $b_{2i}$ and $d_{2i}$, between $b_{1q}$ and $d_{1q}$ and between $b_{2q}$ and $d_{2q}$. The way the switches $S_5$ to $S_{20}$ are controlled by the digital signals is to close the switches according to the following relation. All switches not designated closed are open:

| $b_{1i}$ | $b_{2i}$ | $b_{1q}$ | $b_{2q}$ | Switches Closed | |
|---|---|---|---|---|---|
| 0 | 0 | 0 | 0 | $S_9$ | $S_{13}$ |
| 0 | 0 | 0 | 1 | $S_{11}$ | $S_{14}$ |
| 0 | 0 | 1 | 0 | $S_{11}$ | $S_6$ |
| 0 | 0 | 1 | 1 | $S_9$ | $S_5$ |
| 0 | 1 | 0 | 0 | $S_{10}$ | $S_{15}$ |
| 0 | 1 | 0 | 1 | $S_{12}$ | $S_{16}$ |
| 0 | 1 | 1 | 0 | $S_{12}$ | $S_8$ |
| 0 | 1 | 1 | 1 | $S_{10}$ | $S_7$ |
| 1 | 0 | 0 | 0 | $S_{18}$ | $S_{15}$ |
| 1 | 0 | 0 | 1 | $S_{20}$ | $S_{16}$ |
| 1 | 0 | 1 | 0 | $S_{20}$ | $S_8$ |
| 1 | 0 | 1 | 1 | $S_{18}$ | $S_7$ |
| 1 | 1 | 0 | 0 | $S_{17}$ | $S_{13}$ |
| 1 | 1 | 0 | 1 | $S_{19}$ | $S_{14}$ |
| 1 | 1 | 1 | 0 | $S_{19}$ | $S_6$ |
| 1 | 1 | 1 | 1 | $S_{17}$ | $S_5$ |

While there has been shown what are considered to be the preferred embodiments of the invention, it will be manifest that many changes and modifications may be made therein without departing from the essential spirit of the invention. It is intended, therefore, in the annexed claims, to cover all such changes and modifications as fall within the true scope of the invention.

I claim:

1. In a quadrature transmission system having first and second demodulators for demodulating two independent information signals which modulate the quadrature phase of a carrier, said modulators utilizing a first and second reference phase signal for demodulating the two independent information signals; apparatus for controlling the phase of said first and second reference phase signals comprising in combination:

a. a first and second sample and hold means, one connected to the output of said first demodulator and the other connected to the output of said second demodulator, said sample and hold means sampling the output signals from said demodulators at periodic times and retaining said signals until the next sample time;

b. a first and second summation means, one connected to receive the output of said first sample and hold means and the other connected to receive the output of said second sample and hold means;

c. a first and second analog to digital converter means, one connected to the output of said first summation means and the other connected to the output of said second summation means, providing a first and second digital output signal, respectively, which signals are proportional to the output signals from said summation means;

d. a first and second equalization means one equalization means connected to receive the output of said first analog to digital converter means and the output of said first summation means, with the output of said one equalization means connected to the input of said first summation means for providing an equalized signal that is subtracted from the output signal of said first sample and hold means by said first summation means and the other equalization means connected to receive the output of said second analog to digital converter means and the output of said second summation means, the output of said other equalization means being connected to the input of said second summation means for providing an equalized signal which is subtracted from the output signal of said second sample and hold means by said second summation means;

e. switching means receiving as inputs the signals from said first and second summation means for providing said signals as an error signal in response to said first and second digital output signals from said analog to digital converter means; and f. variable oscillator means responsive to said provided error signals for providing a first and second reference phase signal to said demodulators which signal varies as a function of said provided error signal so as to minimize said provided error signal.

2. The invention according to claim 1 and further comprising:

a pair of low pass filters, one each interposed between the output of said first and second demodulators and the inputs to said first and second sample and hold means, so as to eliminate high frequency components of said independent information signals.

3. The invention according to claim 1 wherein said switching means is comprised of:

a. an amplifier having a positive and a negative input terminal, and an output terminal connected to drive said variable oscillator means;

b. first and second switch means connecting the output of said first sample and hold means to the positive and negative input terminals, respectively, of said amplifier, said first switch means activated by the first digital output signal from said analog to digital converter and said second switch means activated by the complement of said first digital output signal; and c. third and fourth switch means connecting the output of said second sample and hold means to the positive and negative input terminals, respectively, of said amplifier, said third switch means activated by the complement of said second digital output signal from said analog to digital converter and said fourth switch means activated by said second digital output signal.

* * * * *